J. W. FISCHER.
TAILOR'S MEASURING OR FITTING COAT.
APPLICATION FILED MAY 12, 1916.

1,221,302.

Patented Apr. 3, 1917.
3 SHEETS—SHEET 2.

Witness
M. Tobias

Inventor
Joseph W. Fischer
By W. W. Williamson
Attorneys

J. W. FISCHER.
TAILOR'S MEASURING OR FITTING COAT.
APPLICATION FILED MAY 12, 1916.
1,221,302.
Patented Apr. 3, 1917.
3 SHEETS—SHEET 3.
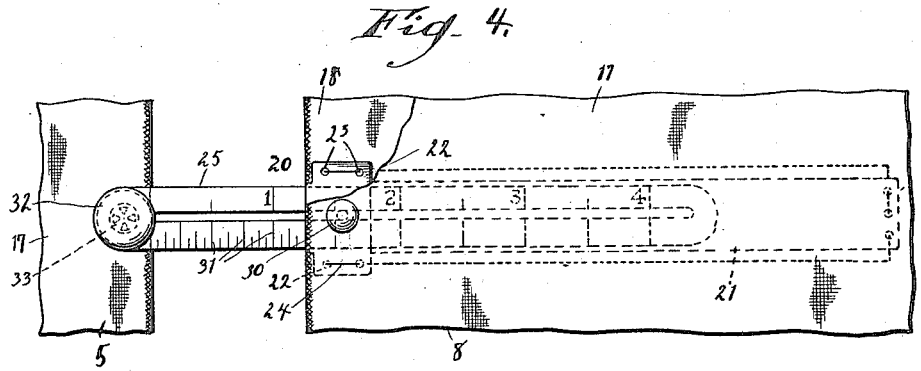
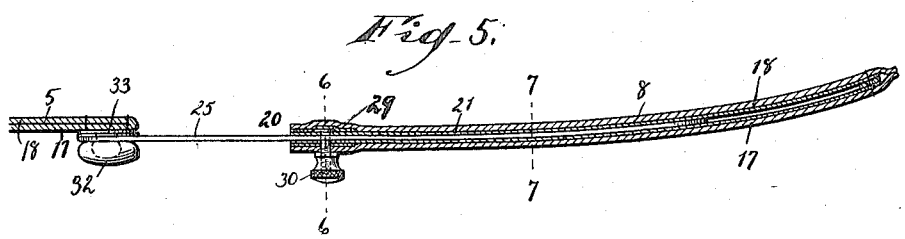
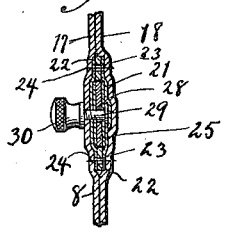
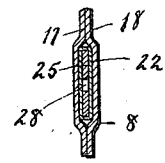
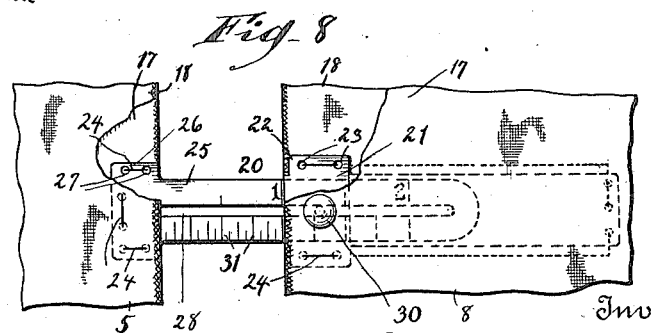
Witness
M. Tobias
Inventor
Joseph W. Fischer
By W. W. Williamson
Attorneys

UNITED STATES PATENT OFFICE.

JOSEPH W. FISCHER, OF PHILADELPHIA, PENNSYLVANIA.

TAILOR'S MEASURING OR FITTING COAT.

1,221,302.  Specification of Letters Patent.  Patented Apr. 3, 1917.

Application filed May 12, 1916. Serial No. 97,035.

*To all whom it may concern:*

Be it known that I, JOSEPH W. FISCHER, a citizen of the United States, residing at Philadelphia, in the county of Philadelphia and State of Pennsylvania, have invented new and useful Improvements in Tailors' Measuring or Fitting Coats, of which the following is a specification.

My invention relates to new and useful improvements in tailor's measuring or fitting coat, and has for its object to provide an exceedingly simple and effective device of this character whereby the measurements of a person may be readily and quickly ascertained for the purpose of reproducing a pattern or coat to fit said person.

A further object of the invention is to provide a measuring or fitting coat which will embody all the elements of a completed coat such as the body cloth, the lining, stiffening, padding, so that when the coat to be reproduced is finished it will be an exact duplicate of the measuring and fitting coat, and thus properly fit the person measured, overcoming the necessity of alterations, and thereby saving considerable time and expense.

A still further object of the invention is to produce a completed coat made up from a number of separable parts or sections joined together by measuring slides along the lines occupied by the seams of the completed garment.

With these ends in view, this invention consists in the details of construction and combination of elements hereinafter set forth and then specifically designated by the claim.

In order that those skilled in the art to which this invention appertains may understand how to make and use the same, I will describe its construction in detail, referring by numeral to the accompanying drawing forming a part of this application, in which—

Fig. 4, is a front elevation of a section of the garment, showing the construction of one of the measuring slides, the manner in which it is attached to the garment.

Fig. 5, is a longitudinal sectional view thereof.

Fig. 6, is a section at the line 6—6 of Fig. 5.

Fig. 7, is a section at the line 7—7 of Fig. 5; and

Fig. 8, is a face view of a section of a garment showing a modified form of measuring slide applied thereto, this form preferably being used between the parts of the back section of the garment.

Figure 1:
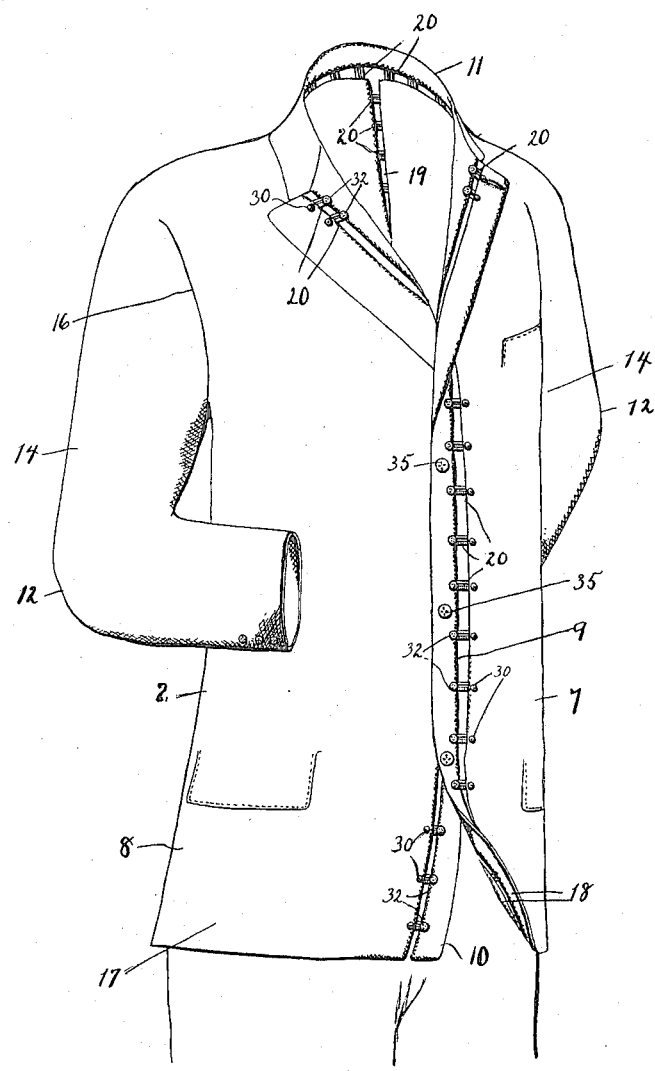
Figure 1, is a perspective view of a measuring or fitting coat made in accordance with my improvement.
Figure 2:
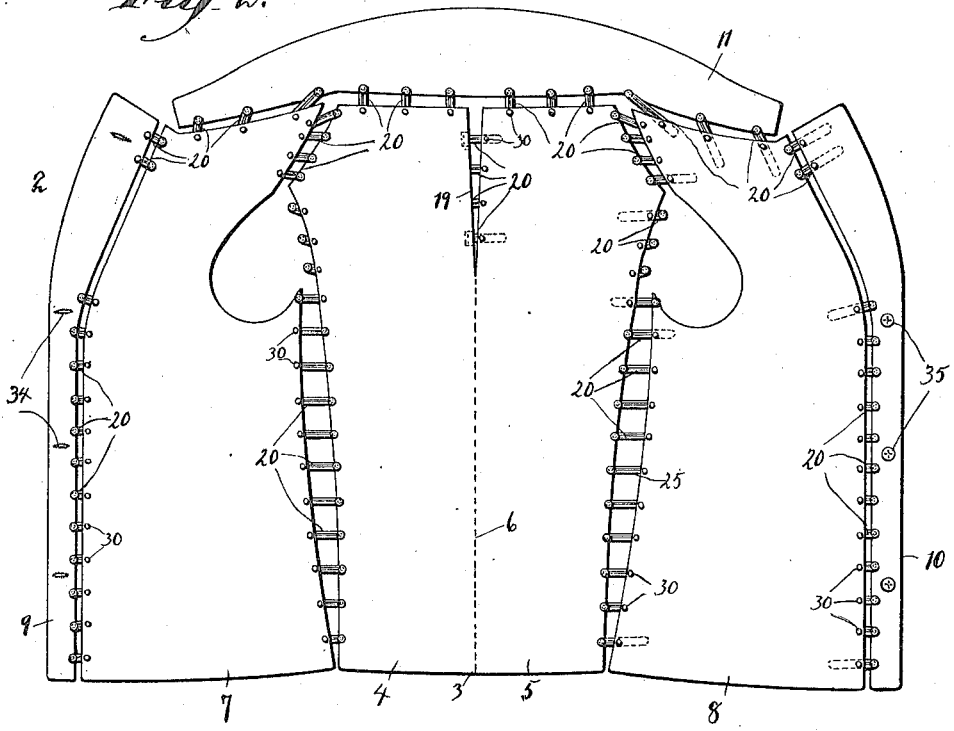
Fig. 2, is a diagrammatic view thereof with the sleeves removed.
Figure 3:
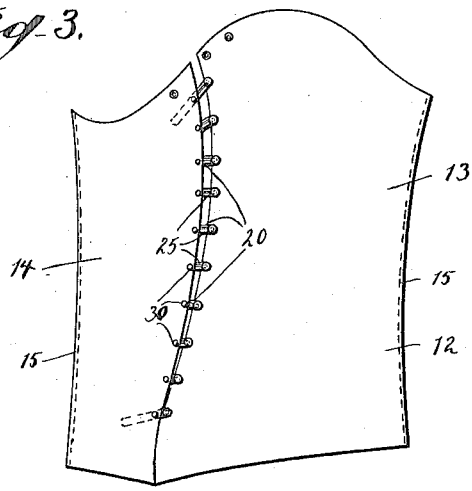
Fig. 3, is a similar view of one of the sleeves.

In carrying out my invention as here embodied 2 represents a measuring or fitting coat or garment comprising a back section 3 made of two parts 4 and 5 and joined together by stitches 6 throughout a portion of their length or from the lower edge to a point some distance removed from the upper edge, the front sections 7 and 8, the revers 9 and 10, the collar 11 and the sleeves 12 each sleeve consisting of the back part 13 and the front part 14 permanently joined together along the inseam by stitches 15, and each sleeve permanently joined to the front sections as at 16.

It is to be particularly understood that the different sections of the garment are made completely the same as a ready to wear garment, and comprises the body cloth 17, and the lining 18 as well as the stiffening, pads and so forth, thus making it unnecessary to allow for these elements when cutting as must be done when a person is measured with a skeleton device or tape measure, thus overcoming the necessity of fitting, or what is known as cutting and trying on, thereby saving considerable time and expense.

The back section as before stated is formed of two pieces 4 and 5 joined together throughout a portion of their length, thereby forming a seam from the lower edge of the back to a point some distance below the upper edge of said back and this open portion of the joint designated by the numeral 19 is left open for the purpose of measuring round shouldered or hunchbacked persons, and the parts 4 and 5 of the back are joined together at this open space by a number of measuring devices or slides 20 each comprising a sheath 21 having side edge projections 22 at the outer end in which are formed a number of perforations 23, whereby the sheath may be sewed to the garment between the body cloth and the lining by stitching or threads 24, and the inner end of the sheath is also provided with similar perforations for fastening said inner end of the sheath in position.

In the sheath is slidably mounted the slide measure or rule 25 having side edge projections 26 at one end thereof, said side edge projections being provided with perforations 27 for stitching the slide measure to the opposite or adjacent section or part of the garment between the body cloth and lining thereof.

The slide measure is provided with a longitudinal slot 28 which registers with a screw 29 carried by the sheath, said screw having a thumb nut 30 of any suitable design mounted thereon for drawing the parts together to hold the slide measure in its adjusted position, whereby the measurements indicated by the graduation 31 on the slide measure may be maintained indefinitely and read from time to time.

This form of measuring device is preferably used between the parts 4 and 5 of the back section, as it is unnecessary to separate these parts, and the use of the measuring device at this point is to indicate the amount of goods necessary to cover a person's round shoulders or hunchback.

At the other points where the sections are connected I use a measuring device constructed similar to the one hereinbefore described with the exception that the slide measure 25 carries a fastening device 32 at its outer end which is in the form of one member of the well known glove button clasp, and this is adapted to engage the complementary fastening device 33 carried by the adjacent section of the garment. One of these members is a socket and the other is a stud.

The slide measure and sheath is preferably formed from celluloid, and when the garment is contracted or all of the joints or seam portions are in contact with each other, there is nothing visible except the fastening members and the thumb nut.

The front sections are provided with a group of measuring devices shown in Figs. 4 and 5 arranged at intervals between the chest portion and the lower edge or skirt, and these are arranged to coact with the complementary fastening devices carried by the meeting edges of the revers, one of the revers 9 having button holes 34 arranged to register with buttons 35 carried by the other revere 10, and each of these revers is provided with a number of spaced measuring devices adjacent the neck end arranged to coact with the complementary fastening devices carried by the front sections adjacent the top or neck ends.

The front sections are provided with another group of these measuring devices at intervals along the shoulder blade running from the neck to the armhole and arranged to coact with the complementary fastening devices carried by the back section and still another group of these measuring devices is carried by the front sections along the side seam, and arranged at intervals between the skirt and a point adjacent the arm pit, and these engage complementary fastening devices carried by the adjacent meeting edge of the back section.

Still another group of these measuring devices is carried by the front sections at the neck end thereof, and these engage complementary fastening devices carried by the collar adjacent each end thereof.

The collar is further secured to the garment by another group of measuring devices carried by the neck end of the back sections and arranged to engage complementary fastening devices secured to the collar. The front and back sections of the sleeve are attached together along their back seam by a group of these measuring devices arranged at intervals carried by the front section of the sleeve and arranged to coact with complementary fastening devices secured to the back section of the sleeve, and said sleeves are permanently secured to the front sections of the garment and detachably secured to the back section of the garment by another group of measuring devices carried by the back section of the garment and arranged to engage complementary fastening devices secured to the sleeve, some of which are carried by each section of said sleeves.

From the foregoing it will be seen that I have produced a measuring and fitting garment which when placed upon a person will expand at all or some of the unsewed seams or joints and when so expanded may be tightened so that they will be held in their adjusted positions, so that the cutter or tailor may after the garment has been removed from the person fitted, consult the measurements at a future time, and as often as is necessary.

After the measurements have been taken the garment is removed from the person and if found desirable a pattern is made therefrom by first marking out on paper the lines of the garment sections and then adding other lines thereto that correspond to the measurements taken. For instance if the revers are moved away from the front section so that a space is left between amounting to one inch, then the pattern is drawn with an addition of one inch along the front edge of the front section, which in the completed garment includes the revers, but if the space between the back section and the front sections amounts to an inch, then a line is drawn one half an inch away from the edges of both of the front and back sections, so that this amount of goods is added to each of these sections, and the seam in the completed garment will be midway between the space left between the back and front sections on the fitting garment. The width of the sleeves, the height of the collar, the distance across the back and other measurements are taken in the manner described.

In actual practice it has been found that a person may be measured and fitted by this device, and a completed garment made from these measurements will not have to be altered and it is unnecessary to have the customer call for another fitting or try on.

Of course I do not wish to be limited to the exact details of construction as herein shown, as these may be varied within the limits of the appended claim without departing from the spirit of my invention.

Having thus fully described my invention, what I claim as new and useful, is—

A tailor's measuring or fitting coat comprising a back section consisting of two parts joined together throughout a portion of the length, measuring devices secured to the parts at intervals along the unjoined portion, front sections, measuring devices for joining said front sections to the back section, revers, measuring devices for joining said revers to the front sections, a collar, measuring devices for attaching said collar to the back and front sections, a sleeve consisting of front and back sections, permanently secured together along their front seam, measuring devices for joining said sections together along their back seam, said sleeves being permanently secured to the front sections throughout a portion of their circumference, and measuring devices for attaching said sleeve to the back section.

In testimony whereof, I have hereunto affixed my signature in the presence of two subscribing witnesses.

JOSEPH W. FISCHER.

Witnesses:
 WM. J. QUAIN,
 MARY M'CALLA.

Copies of this patent may be obtained for five cents each, by addressing the "Commissioner of Patents, Washington, D. C."